(12) United States Patent
Zhu et al.

(10) Patent No.: US 8,938,611 B1
(45) Date of Patent: Jan. 20, 2015

(54) ENTERPRISE CLOUD SECURITY GATEWAY (75) Inventors: Minhang Zhu, Changzhou (CN); Bin Shi, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 65 days.

(21) Appl. No.: 13/365,151

(22) Filed: Feb. 2, 2012

(51) Int. Cl.
*H04L 29/06* (2006.01)
*H04L 12/931* (2013.01)

(52) U.S. Cl.
CPC .................................... *H04L 49/70* (2013.01)
USPC ............................................ 713/153; 726/27

(58) Field of Classification Search
CPC ................... G06F 21/575; G06F 2009/45533; H04L 49/70
USPC ............................................ 726/15; 713/153
See application file for complete search history.

(56) References Cited

U.S. PATENT DOCUMENTS

| 2008/0002663 | A1* | 1/2008 | Tripathi et al. | 370/351 |
| 2011/0296409 | A1* | 12/2011 | Lo et al. | 718/1 |
| 2011/0302415 | A1* | 12/2011 | Ahmad et al. | 713/168 |

* cited by examiner

*Primary Examiner* — Hadi Armouche
*Assistant Examiner* — Dao Ho
(74) *Attorney, Agent, or Firm* — Beyer Law Group LLP (57) ABSTRACT

A security virtual machine is provided in a network including a resource shared among two or more virtual machines. All data traffic from each virtual machine to or from the shared resource is transmitted over an encrypted channel to the security virtual machine. Each connection between a virtual machine and the security virtual machine is maintained as a separate encrypted channel, preventing one virtual machine from accessing data sent to or from another virtual machine, even though the virtual machines are all sharing the same resource.

20 Claims, 5 Drawing Sheets

FIG. 1

Prior Art

ENTERPRISE CLOUD SECURITY GATEWAY

FIELD OF THE INVENTION

The present invention relates generally to computing devices. More particularly, the present invention relates to providing security in an enterprise cloud.

BACKGROUND OF THE INVENTION

In a traditional network environment, security to protect from external intruders is typically provided at the edge of the network. The devices that implement this network edge security are typically known as edge devices. Edge devices are gateways, routers, routing switches, integrated access devices (IADs), multiplexers, and a variety of metropolitan area network (MAN) and wide area network (WAN) access devices that provide entry points into enterprise or service provider core networks. Edge devices also provide connections into carrier and service provider networks.

Various types of security can be implemented on the edge devices, but the inherent characteristics of the network, in that the "gateway" to entry is located at a single point, makes such security relatively straightforward.

Figure 1:
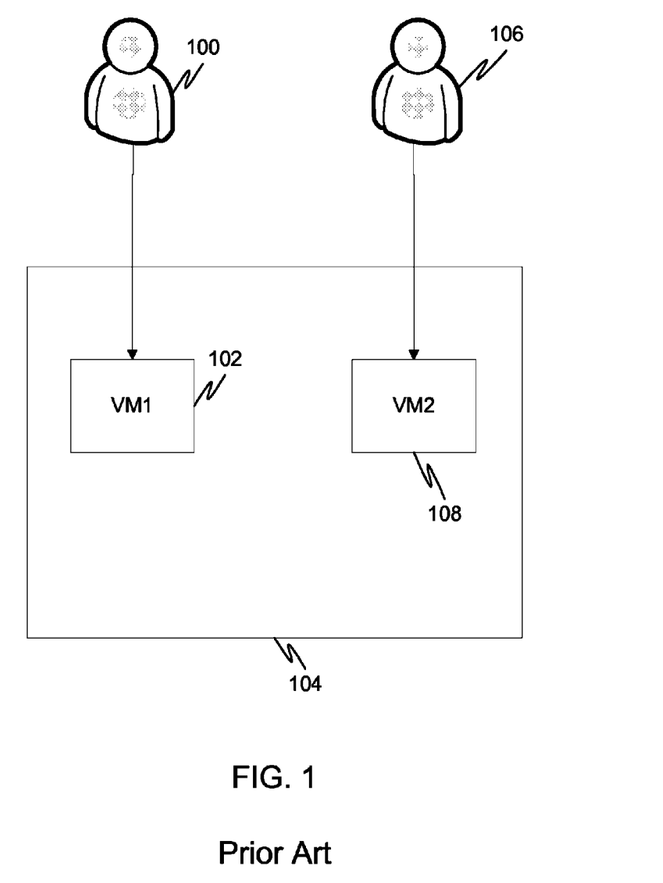
FIG. 1 is a block diagram illustrating an example of cloud computing.

The rise of cloud computing, however, has rendered the traditional network architecture somewhat moot. Cloud computing involves sharing of computing infrastructure, such as processing power, memory, etc., typically between users having no relation to one another. In public cloud computing networks, in fact, any user could theoretically be sharing a resource with any other user and may (or may not) have the ability to know who is sharing with whom. Closely tied with cloud computing is the concept of virtualization, which involves the creation of a virtual (rather than actual) version of something, such as a hardware platform, operating system, a storage device or network resources. Cloud computing is often accomplished by creating two or more virtual machines operating on a single actual machine. FIG. 1 is a prior art block diagram illustrating an example of cloud computing. Here, user A 100 operates a virtual machine 102, which is actually operating on shared machine 104 in the cloud. User B 106 operates a virtual machine 108, which is actually also operating on shared machine 104 in the cloud. As can be seen in such an arrangement, there is no edge device protecting virtual machine 102 from virtual machine 108. In short, edge devices are disappearing.

Attackers can launch virtual machines on the same hardware platforms with target virtual machines. By exploiting system vulnerabilities, they can sniff and modify users' network data even if the user's virtual machine does not have a security hole that allows direct access.

What is needed is a solution that aids in the security of networks and network devices without utilizing an edge device.

SUMMARY OF THE INVENTION

Embodiments are provided that include a security virtual machine acting to form encrypted channels for new virtual machines sharing the same resource, preventing one virtual machine from accessing data traffic from another virtual machine, despite both virtual machines sharing the same resource.

In a first embodiment of the present invention, a method for providing security between multiple virtual machines sharing a resource is provided, the method comprising: establishing a first virtual machine associated with the resource; establishing a first encrypted channel between a security virtual machine and the first virtual machine; modifying the first virtual machine so that data traffic sent to the first virtual machine for use with the resource is securely routed to the security virtual machine over the first encrypted channel; establishing a second virtual machine associated with the resource; establishing a second encrypted channel between the security virtual machine and the second virtual machine, wherein the first encrypted channel is different than the first encrypted channel such that the first virtual machine cannot directly communicate with the second virtual machine; and modifying the second virtual machine so that data traffic sent to the second virtual machine for use with the resource is securely routed to the security virtual machine over the second encrypted channel.

In a second embodiment of the present invention, a method for securely communicating is provided, comprising: receiving, at a first virtual machine, a request to perform a function requiring the use of a first resource associated with the first virtual machine, wherein the first resource is shared with a second virtual machine; accessing a routing table in the first virtual machine, wherein the routing table contains an entry for a security virtual machine; and redirecting traffic, including the request to perform a function requiring the use of the first resource, to the security virtual machine, wherein the security virtual machine corresponds to the first resource and wherein the redirected traffic is encrypted on a first encrypted channel in order to send it to the security virtual machine, wherein the first encrypted channel is different than a second encrypted channel used to send traffic between the second virtual machine and the security virtual machine.

In a third embodiment of the present invention, a method for sharing a resource in a public cloud is provided, the method comprising: operating an agent in a first virtual machine corresponding to the resource to redirect communications between a first network device and the first virtual machine so that they are between the first network device and a security virtual machine corresponding to the resource, using a first encrypted channel; and operating an agent in a second virtual machine corresponding to the resource to redirect communications between a second network device and the second virtual machine so that they are between the second network device and the security virtual machine using a second encrypted channel different than the first encrypted channel.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In an embodiment of the present invention, a specialized security virtual machine is deployed in a public cloud. The security virtual machine creates encrypted communication channels and switches network data between virtual machines. A user's virtual machine can only communicate with the security virtual machine using an encrypted channel, and direct communication between virtual machines is forbidden. This adds an additional layer of security so that malicious virtual machines cannot obtain any information about other virtual machines sharing the same resource, or the data traffic therefrom.

It should be noted that while the present invention allows for security to be established in a network without using an edge device, in many implementations an edge device may still exist and provide some level of security functionality to the network. As such, the present invention will be described with examples including edge devices, as well as with examples lacking edge devices.

Figure 2:
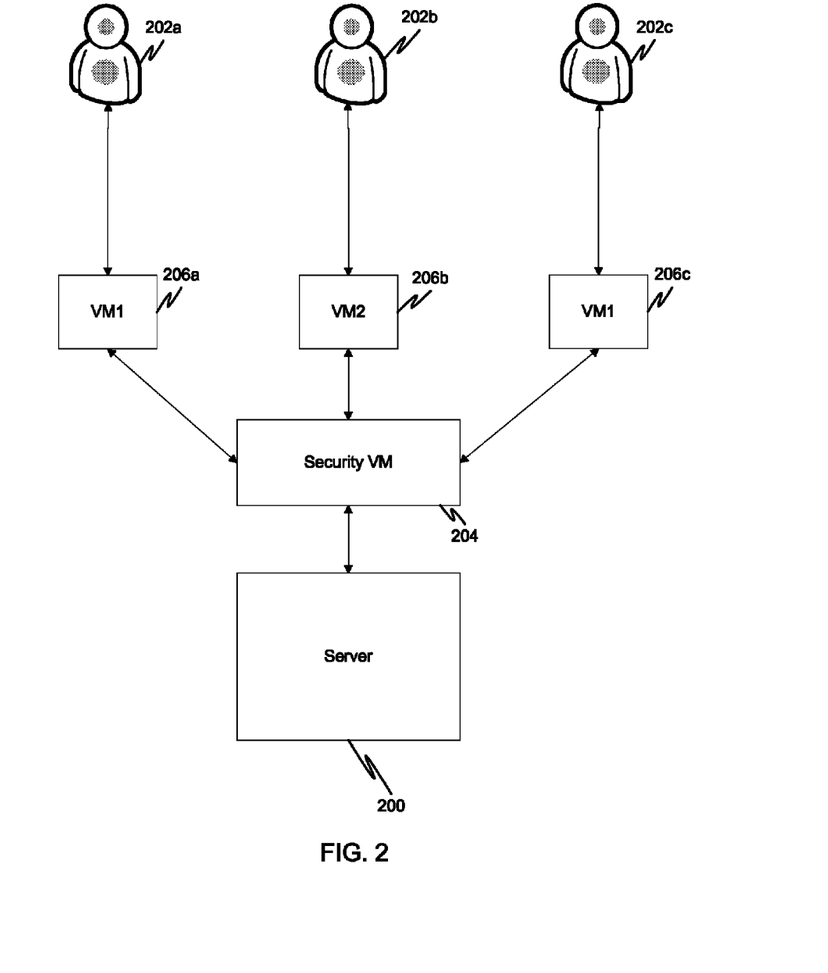
FIG. 2 is a block diagram illustrating an example public cloud in accordance with an embodiment of the present invention.

FIG. 2 is a block diagram illustrating an example cloud in accordance with an embodiment of the present invention. This cloud may be either a public cloud or private cloud. As long as two or more virtual machines are shared by a single virtual machine, the present invention can be used to enhance network security.

Here, server 200 contains some resource (e.g., memory, processing power, etc.) that is desired to be shared between two or more users 202a, 202b, 202c. A security virtual machine 204 is provided that corresponds to the resource being shared. In this figure, the security virtual machine 204 is depicted as implemented on a computer separate from server 200, however in some embodiments the security virtual machine 204 and the server 200 may reside on the same physical machine. Additionally, this example describes an embodiment where a single resource is being shared from server 200. However, in some embodiments, server 200 may have several resources to share. In such embodiments, it may be necessary to have a different security virtual machine 204 for each available resource. However, in some embodiments, a single security virtual machine can be designed to share multiple resources with multiple users.

In one embodiment of the present invention, templates may be included with an agent installed by users of the cloud. After user login, the network is configured to utilize the user's machine. The applications on individual virtual machines can be modified to provide the security network traffic benefits in accordance with the present invention. This modification may be either direct or indirect. For example, an application can be expressly modified so that a procedure call that accesses a particular address on a virtual machine instead refers to a particular address on the security virtual machine (or at least controlled by the security virtual machine). This is an example of direct modification. Indirect modification may be accomplished by altering a data structure that is used by the underlying application. For example, a routing table that is accessed by the application can be modified so that a particular address on a virtual machine is changed to a particular address on the security virtual machine, thus effectively changing the operation of the application when the application uses the routing table to access the virtual machine.

Security virtual machines can operate much like a virtual private network (VPN) server. Other virtual machines or users can automatically connect to the security virtual machine using the deployed configuration file. Standard VPN protocols can be used to create a data structure to track the different machines and resources.

Referring back to FIG. 2, a separate virtual machine 206a, 206b, 206c may be created for each user 202a, 202b, 202c that wishes to share the resource. Rather than communicate directly with the server 204, each of these virtual machines 206a, 206b, 206c is configured to send data traffic to the security virtual machine 204 via an encrypted channel.

It should be noted that there is not necessarily a separate virtual machine for each user. While in many cases a user will have only one virtual machine assigned to himself or herself, there may be instances where a single user may have multiple virtual machines. As such, the present invention should not be interpreted as being limited to virtual machines uniquely associated with single users. Likewise, there is not necessarily a separate user for each virtual machine. In some instances, multiple users can share a single virtual machine. As such, the present invention should not be interpreted as being limited to virtual machines having only a single user.

In order to support different network environments, the security virtual machine can support multiple types of encrypted channels at the same time. This includes, for example, VPN channels (PPTO, L2TP, IP Sec, SSL VPN, etc.) and Encrypted Tunnels (share key, SSL certificates, etc.) The security virtual machine can provide multiple sessions and connections to the same user or virtual machine, merely assigning a different IP address if necessary.

Figure 3:
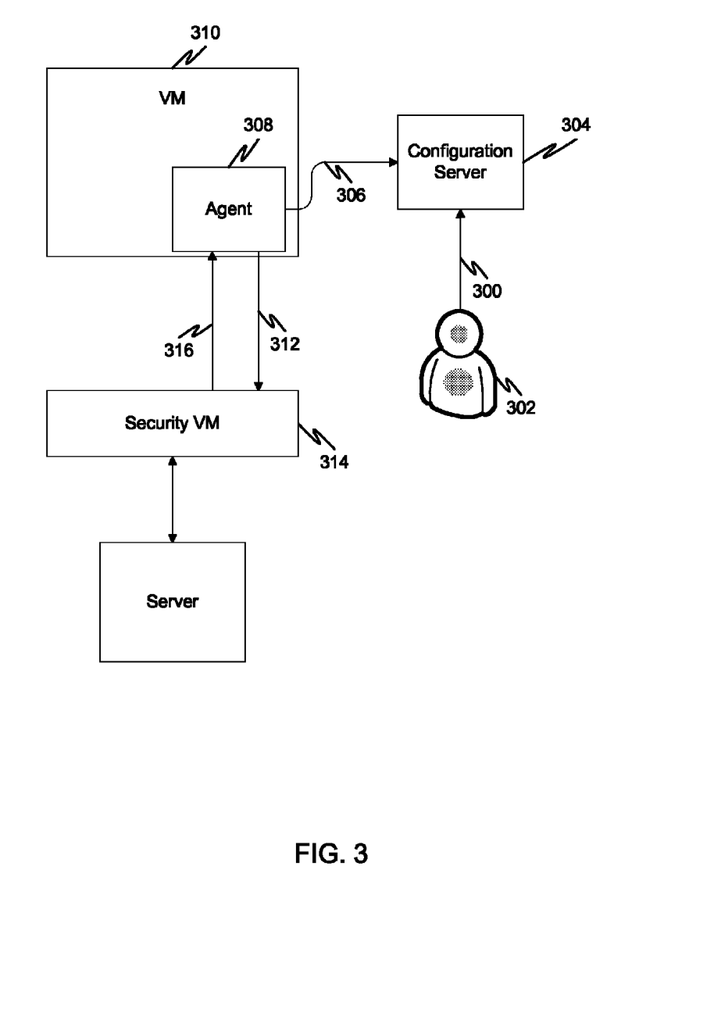
FIG. 3 is a block diagram illustrating an example process in accordance with an embodiment of the present invention.

An agent application can be installed on a virtual machine. The agent application can take the responsibility to establish encrypted channels with a security virtual machine and forward all data traffic to the security virtual machine. FIG. 3 is a block diagram illustrating an example process in accordance with an embodiment of the present invention. As can be seen, at 300, an administrator or user 302 sets a network setting for a virtual machine on a configuration server 304. The configuration server is a global server that is designed to use a unique domain name and provide web services. The administrator or user 302 can configure the settings on the web page and the settings can then be automatically deployed to the cloud by agents on each virtual machine. These settings can include all the configuration information needed to establish the encrypted channels and correctly route traffic to the security virtual machine. For example, the settings may include information about what protocol to use to encrypt the data traffic, as well as security information such as keys used for the encryption. The settings may also include information about how to modify the routing table so that the traffic is rerouted to the appropriate location using the appropriate encryption mechanism.

At 306, an agent 308 in virtual machine 310 can retrieve the network setting from the configuration server 304. At 312, the agent 308 can establish an encrypted channel with the security virtual machine 314. The agent 308 can also modify the routing table of the virtual machine 310, redirecting all traffic to the security virtual machine 314. Modification of the routing table is a mechanism to reroute traffic in public clouds. Private clouds may use a different mechanism, especially in cases where TCP/IP is not being utilized, as there is no default routing table. TCP/IP sets up a routing table as a default when a new IP address is assigned to a VPN client. Since public clouds utilize TCP/IP, the routing table implementation is the most common. Of course, if at some point public clouds begin to utilize other protocols, the present invention may be modified to utilize a different mechanism than routing tables to reroute traffic. At 316, the agent 308 can receive confirmation from the security virtual machine 314 that the encrypted channel has been established and the routing table has been modified.

Using the method of the present invention, all data traffic between virtual machine 310 and security virtual machine 314 has been encrypted and so may the traffic between other virtual machines and the security virtual machine 314, even when the virtual machines are located on the same physical machine. This can prevent unauthorized virtual machines from attacking the network and/or gaining access to information not authorized to be disclosed, by virtue of the encryption preventing the accessing of other virtual machines.

When a user wishes to access private data in a cloud, he or she can establish an encrypted channel with the security virtual machine remotely. This can be accomplished in two ways: by establishing an encrypted channel on an endpoint, or by establishing an encrypted channel on an edge router of a local network. Regardless of the way this is accomplished, the result will eventually wind up the same—protection of the virtual machines even though they are located on the same physical machine and share physical resources.

If a user establishes the encrypted channel on an edge router, he can connect the local network and the cloud network together to build an isolated private network. In other words, a traditional network can be tied to a cloud network. This can result in sort of an extended private network, where aspects of the private network extend out into the public cloud.

Various network security inspection functions can be built into the security virtual machine. These include, for example, firewall, IPS/IDS, application control, URL filtering, data leakage protection, anti-virus and anti-malware functions. Indeed, any network protection aspect could conceivably be built into the security virtual machine. Because the security virtual machine can perform these tasks, which are traditionally performed by a network edge device such as a gateway, the security virtual machine can be thought of as a "virtual gateway."

Additionally, the present invention is designed such that it is capable of being completely transparent to users of the first and second virtual machines. In other words, users of these virtual machines need never know that a security virtual machine is being used, or even that anything has changed from traditional virtual machines. Of course, in some embodiments the users may be aware of these aspects (either by virtue of outside knowledge, or by virtue of the network administrator not setting up the network to keep these aspects from the users), but the design of the present invention allows some embodiments where users are unaware of them.

All data traffic of virtual machines in the cloud intended for server 200 is inspected by the security virtual machine at first. It can then block any attack, or undertake some other procedure to thwart the attack. For example, authorities can be alerted as to the threat. In another example, the offending virtual machine can be removed from the physical machine.

In some instances the attack may not be completely evident. For example, the one virtual machine may be attempting to access a location on another virtual machine. This access attempt alone may not be enough to determine whether the virtual machine is malicious. In some instances, a virtual machine may be accidentally attempting to access another virtual machine. In other words, the virtual machine may be deliberately attempting to access the other virtual machine, believing such access is allowed.

System Process

Figure 4:
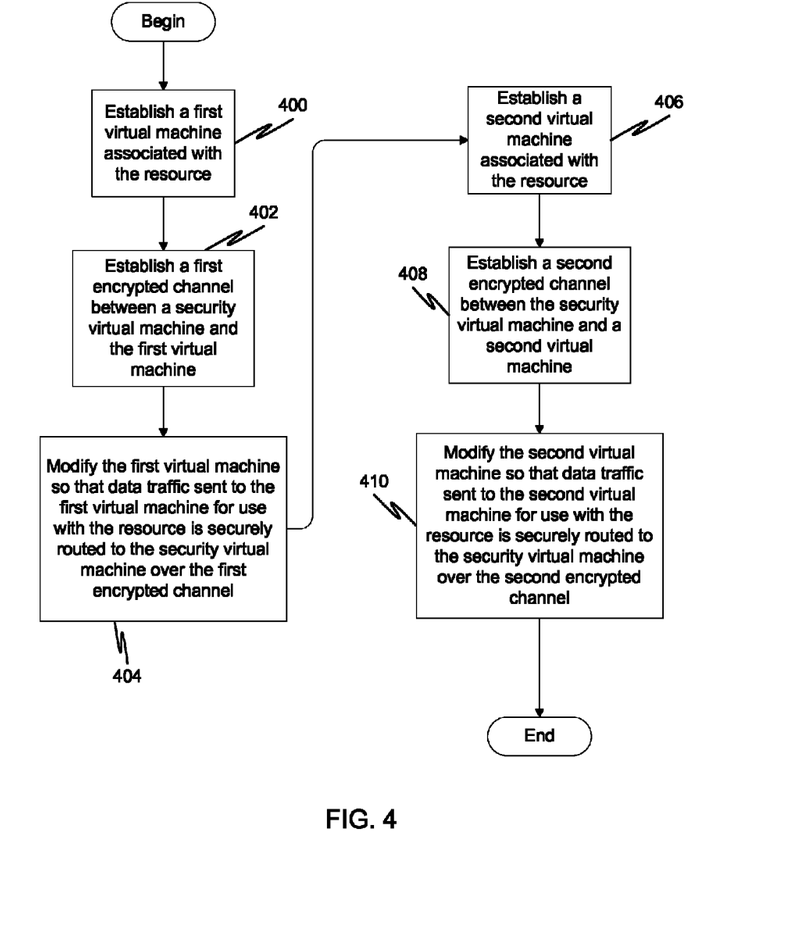
FIG. 4 is a flow diagram illustrating a method for providing security between multiple virtual machines sharing a resource in accordance with an embodiment of the present invention.

FIG. 4 is a flow diagram illustrating a method for providing security between multiple virtual machines sharing a resource in accordance with an embodiment of the present invention. At 400, a first virtual machine associated with the resource is established on a server computer that implements the resource. At 402, a first encrypted channel is established between a security virtual machine (and also on the server) and the first virtual machine. At 404, the first virtual machine is modified so that data traffic sent to the first virtual machine for use with the resource is securely routed to the security virtual machine over the first encrypted channel. This may be accomplished by modifying the underlying application itself to send traffic directly to the security virtual machine, or may be accomplished by modifying a routing table or other data structure accessed by the underlying application to alter the destination address. At 406, a second virtual machine associated with the resource is established on the server. At 408, a second encrypted channel is established between the security virtual machine and the second virtual machine. The second encrypted channel is different than the first encrypted channel such that the first virtual machine cannot directly communicate with the second virtual machine. At 410, the second virtual machine is modified so that data traffic sent to the second virtual machine from a user using a computer not located in the cloud for use with the resource is securely routed to the security virtual machine over the second encrypted channel. As with the first virtual machine, this may be accomplished by modifying the underlying application itself to send traffic directly to the security virtual machine, or may be accomplished by modifying a routing table or other data structure accessed by the underlying application to alter the destination address.

Server Embodiment

Figure 5:
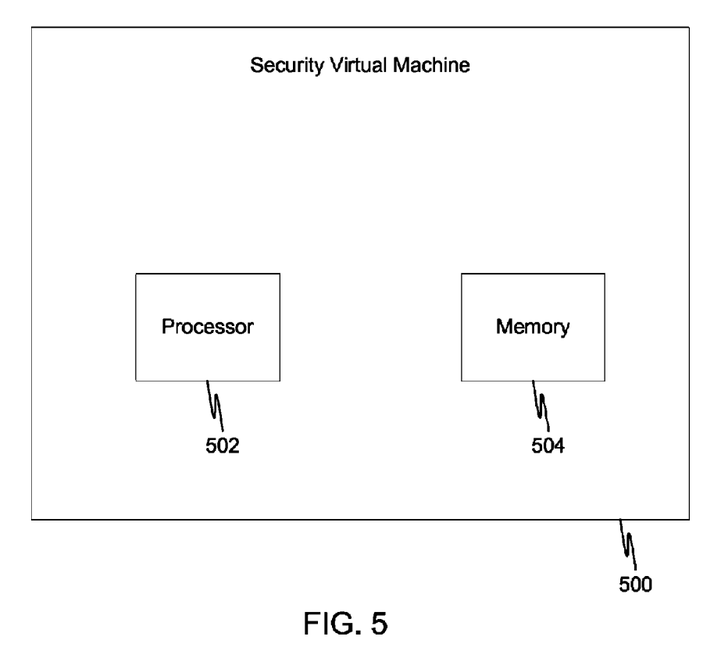
FIG. 5 illustrates a server 500 suitable for implementing embodiments of the present invention.

FIG. 5 illustrates a security virtual machine 500 suitable for implementing embodiments of the present invention. FIG. 5 shows one possible physical form of the security virtual machine. Of course, the security virtual machine may have many physical forms including an integrated device, such as a desktop computer, laptop computer, or any other device that provides a sharable resource Security virtual machine 500 may include one or more processors 502. These processors may be of any type, including, but not limited to, x86 processors, multi-core processors, microprocessors, graphic processors, etc. Security virtual machine 500 may also include various types of memory 504, including random access memory (RAM) and read-only memory (ROM). As is well known in the art, ROM acts to transfer data and instructions uni-directionally to a processor and RAM is used typically to transfer data and instructions in a bi-directional manner. Both of these types of memories may include any suitable of the computer-readable media described below. A fixed disk may also be coupled bi-directionally to the processor; it provides additional data storage capacity and may also include any of the computer-readable media described below. The fixed disk may be used to store programs, data and the like and is typically a secondary storage medium (such as a hard disk) that is slower than primary storage. It will be appreciated that the information retained within fixed disk, may, in appropriate cases, be incorporated in standard fashion as virtual memory in memory.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method for providing security between multiple virtual machines sharing a resource, the method comprising:

establishing a first virtual machine associated with the resource;

establishing a first encrypted channel between a security virtual machine and the first virtual machine;

modifying the first virtual machine so that data traffic sent to the first virtual machine for use with the resource is securely routed to the security virtual machine over the first encrypted channel, wherein the modifying includes altering a routing table of the first virtual machine so that communications directed to the first virtual machine are redirected to the security virtual machine;

establishing a second virtual machine associated with the resource;

establishing a second encrypted channel between the security virtual machine and the second virtual machine, wherein the first encrypted channel is different than the second encrypted channel and uses a different encryption key such that the first virtual machine cannot directly communicate with the second virtual machine by virtue of said different encrypted first and second channels;

modifying the second virtual machine so that data traffic sent to the second virtual machine for use with the resource is securely routed to the security virtual machine over the second encrypted channel, wherein the modifying includes altering a routing table of the second virtual machine so that communications directed to the second virtual machine are redirected to the security virtual machine; and performing at least one network inspection security function at the security virtual machine for data traffic routed to the security virtual machine.

2. The method of claim 1, wherein the first encrypted channel is a different type of encrypted channel from the second encrypted channel.

3. The method of claim 2, wherein the first encrypted channel is a virtual private network and the second encrypted channel is an encrypted tunnel.

4. The method of claim 1, further comprising:

establishing a secure encryption channel between an edge router and the first virtual machine.

5. The method of claim 1, further comprising:

establishing a secure encryption channel between a first endpoint and the first virtual machine.

6. The method of claim 1, further comprising:

performing firewall services at the security virtual machine.

7. The method of claim 1, further comprising:

performing intrusion prevention or detection services at the security virtual machine.

8. The method of claim 1, further comprising:

performing application control at the security virtual machine.

9. The method of claim 1, further comprising:

performing anti-virus services at the security virtual machine.

10. The method of claim 1, wherein said first virtual machine and said second virtual machine may only communicate via said security virtual machine.

11. The method of claim 1, wherein all data traffic between said security virtual machine and said first virtual machine is encrypted using said first encrypted channel, and wherein all data traffic between said security virtual machine and said second virtual machine is encrypted using said second encrypted channel.

12. A method for providing security between multiple virtual machines sharing a resource, the method comprising:

establishing a first virtual machine associated with the resource;

establishing a first encrypted channel between a security virtual machine and the first virtual machine;

modifying the first virtual machine so that data traffic sent to the first virtual machine for use with the resource is securely routed to the security virtual machine over the first encrypted channel by modifying an underlying application of said first virtual machine so that a procedure call that accesses a first address on said first virtual machine refers to a third address on said security virtual machine;

establishing a second virtual machine associated with the resource;

establishing a second encrypted channel between the security virtual machine and the second virtual machine, wherein the first encrypted channel is different than the second encrypted channel and uses a different encryption key such that the first virtual machine cannot directly communicate with the second virtual machine by virtue of said different encrypted first and second channels;

modifying the second virtual machine so that data traffic sent to the second virtual machine for use with the resource is securely routed to the security virtual machine over the second encrypted channel by modifying an underlying application of said second virtual machine so that a procedure call that accesses a second address on said second virtual machine refers to the third address on said security virtual machine; and performing at least one network security inspection function at the security virtual machine for data traffic routed to the security virtual machine;

wherein said first virtual machine and said second virtual machine may only communicate via said security virtual machine.

13. The method of claim 12, wherein the first encrypted channel is a different type of encrypted channel from the second encrypted channel.

14. The method of claim 13, wherein the first encrypted channel is a virtual private network and the second encrypted channel is an encrypted tunnel.

15. The method of claim 12, further comprising:
establishing a secure encryption channel between an edge router and the first virtual machine.

16. The method of claim 12, further comprising:
establishing a secure encryption channel between a first endpoint and the first virtual machine.

17. The method of claim 12, wherein performing the at least one network inspection security function comprises:
performing firewall services at the security virtual machine.

18. The method of claim 12, wherein performing the at least one network inspection security function comprises:
performing intrusion prevention or detection services at the security virtual machine.

19. The method of claim 12, wherein performing the at least one network inspection security function comprises:
performing application control at the security virtual machine.

20. The method of claim 12, wherein performing the at least one network inspection security function comprises:
performing anti-virus services at the security virtual machine.

* * * * *